United States Patent
Stoltz

(10) Patent No.: US 11,130,388 B2
(45) Date of Patent: Sep. 28, 2021

(54) TRANSMISSION MOUNTED ELECTRICAL CHARGING SYSTEM WITH ENGINE OFF COASTING AND DUAL MODE HVAC

(71) Applicant: Eaton Intelligent Power Limited, Dublin (IE)

(72) Inventor: Thomas J. Stoltz, Allen Park, MI (US)

(73) Assignee: Eaton Intelligent Power Limited, Dublin (IE)

(*) Notice: Subject to any disclaimer, the term of this patent is extended or adjusted under 35 U.S.C. 154(b) by 75 days.

(21) Appl. No.: 16/400,305

(22) Filed: May 1, 2019

(65) Prior Publication Data

US 2019/0256077 A1    Aug. 22, 2019

Related U.S. Application Data

(63) Continuation of application No. PCT/US2017/059541, filed on Nov. 1, 2017.
(Continued)

(51) Int. Cl.
*B60K 1/02* (2006.01)
*B60K 6/26* (2007.10)
(Continued)

(52) U.S. Cl.
CPC ........... *B60H 1/3222* (2013.01); *B60H 1/004* (2013.01); *B60K 1/02* (2013.01); *B60K 6/24* (2013.01);
(Continued)

(58) Field of Classification Search
CPC ........ B60H 1/3222; B60H 1/004; B60H 1/02; B60K 6/24; B60K 6/26; B60K 6/28;
(Continued)

(56) References Cited

U.S. PATENT DOCUMENTS 6,600,980 B1 *  7/2003  Kraska ............... B60W 10/06
701/22
2009/0228150 A1   9/2009  Alston
(Continued)

FOREIGN PATENT DOCUMENTS

| EP | 1097831 A2 | 5/2001 |
| EP | 2514620 A1 | 10/2012 |
| WO | 02078987 A2 | 10/2002 |

OTHER PUBLICATIONS

International Search Report and Written Opinion for International Application No. PCT/US2017/059541 dated Feb. 8, 2018, 19 pages.
(Continued)

*Primary Examiner* — Bryan A Evans
(74) *Attorney, Agent, or Firm* — GTC Law Group PC & Affiliates

(57) ABSTRACT

A transmission system selectively coupled to an engine crankshaft of an internal combustion engine arranged on a vehicle includes a transmission, a motor generator an HVAC compressor and a controller. The transmission has an input shaft, a mainshaft, an output shaft and a countershaft offset from the input shaft. The countershaft is drivably connected to the first input shaft and a mainshaft. The motor generator is selectively couple to the countershaft. The HVAC compressor is selectively driven by the motor generator. The controller operates the transmission system in various modes based on operating conditions.

23 Claims, 2 Drawing Sheets

Related U.S. Application Data

(60) Provisional application No. 62/415,677, filed on Nov. 1, 2016.

(51) Int. Cl.

| | | |
|---|---|---|
| *B60H 1/32* | (2006.01) |
| *B60H 1/00* | (2006.01) |
| *B60K 6/36* | (2007.10) |
| *B60K 6/383* | (2007.10) |
| *B60K 6/387* | (2007.10) |
| *B60K 6/48* | (2007.10) |
| *B60W 10/06* | (2006.01) |
| *B60W 10/08* | (2006.01) |
| *B60W 10/11* | (2012.01) |
| *B60W 10/30* | (2006.01) |
| *B60W 20/10* | (2016.01) |
| *B60W 30/18* | (2012.01) |
| *F16H 3/093* | (2006.01) |
| *B60K 17/22* | (2006.01) |
| *B60K 17/02* | (2006.01) |
| *B60K 6/24* | (2007.10) |
| *B60K 6/28* | (2007.10) |

(52) U.S. Cl.
CPC .................. *B60K 6/26* (2013.01); *B60K 6/28* (2013.01); *B60K 6/36* (2013.01); *B60K 6/383* (2013.01); *B60K 6/387* (2013.01); *B60K 6/48* (2013.01); *B60K 17/02* (2013.01); *B60K 17/22* (2013.01); *B60W 10/06* (2013.01); *B60W 10/08* (2013.01); *B60W 10/11* (2013.01); *B60W 10/30* (2013.01); *B60W 20/10* (2013.01); *B60W 30/18063* (2013.01); *B60W 30/18072* (2013.01); *F16H 3/093* (2013.01); *B60K 2006/268* (2013.01); *B60K 2006/4816* (2013.01); *B60W 2030/18081* (2013.01); *Y02T 10/62* (2013.01)

(58) Field of Classification Search
CPC .......... B60K 6/36; B60K 6/383; B60K 6/387; B60K 6/48; B60K 17/02; B60K 17/22; B60K 2006/268; B60K 2006/4816; B60W 10/06; B60W 10/08; B60W 10/11; B60W 10/30; B60W 20/10; B60W 30/18063; B60W 30/18072; B60W 2030/18081; F16H 3/093; Y02T 10/62
See application file for complete search history.

(56) References Cited

U.S. PATENT DOCUMENTS

| | | | |
|---|---|---|---|
| 2011/0307153 A1 | 12/2011 | Razaznejad et al. | |
| 2013/0053201 A1* | 2/2013 | Holmes | B60L 50/15 475/5 |

OTHER PUBLICATIONS

McKay, B., "Benefits of a 48V P2 Mild Hybrid", Continental Powertrain Technology & Innovation, Sep. 30, 2016.
Supplemental European Search Report for EP Application No. 17867121 dated Jul. 9, 2020.

* cited by examiner

US 11,130,388 B2

TRANSMISSION MOUNTED ELECTRICAL CHARGING SYSTEM WITH ENGINE OFF COASTING AND DUAL MODE HVAC

CROSS-REFERENCE TO RELATED APPLICATIONS

This application is a continuation of International Application No. PCT/US2017/059541 filed Nov. 1, 2017, which claims the benefit of U.S. Patent Application No. 62/415,677 filed on Nov. 1, 2016. The disclosure of the above application is incorporated herein by reference.

FIELD

The present disclosure relates generally to a transmission system and related method for operating a motor generator coupled to a countershaft of the transmission system and having a dual heating ventilation air conditioning (HVAC) mode.

BACKGROUND

Automated mechanical transmission (AMT) systems for vehicle use are known in art. As is well known, an AMT includes a clutch and a collection of gears. The AMT performs gear shifts automatically. AMTs can be provided on many vehicles including line haul vehicles and large construction vehicles. Fuel economy regulations are driving the need for greater fuel efficiency in both line haul and vocational vehicles.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A transmission system selectively coupled to an engine crankshaft of an internal combustion engine arranged on a vehicle includes a transmission, a motor generator an HVAC compressor and a controller. The transmission has an input shaft, a mainshaft, an output shaft and a countershaft offset from the input shaft. The countershaft is drivably connected to the first input shaft and a mainshaft. The motor generator is selectively couple to the countershaft. The HVAC compressor is selectively driven by the motor generator. The controller operates the transmission system in various modes based on operating conditions.

According to additional features the transmission system further includes a master clutch having a driving portion connected to the engine crankshaft and a driven portion coupled to the transmission input shaft. The driven portion is adapted to frictionally engage the driving portion between open and closed positions. The controller operates the transmission system in a first engine off coasting (EOC) operating mode that includes defueling the engine while the vehicle is moving based on vehicle operating conditions and routes rotational energy from the output shaft, through the countershaft and into the motor generator. A planetary gear set is coupled between the countershaft and the motor generator. A one-way clutch is coupled between the countershaft and the planetary gear set. The motor generator is one of a 24 volt and 48 volt motor.

In additional features, the controller operates the transmission system in a "crank mode" wherein the HVAC compressor is disengaged from the motor generator and the motor generator turns the internal combustion engine. The controller can further operate the transmission system in a "creep mode" wherein the HVAC compressor is disengaged from the motor generator and the motor generator powers the vehicle. The controller can further operate the transmission system in a "driving with no HVAC mode" wherein the HVAC is disengaged from the motor generator and the master clutch is closed while propelling the vehicle and open during EOC. The controller can further operate in a "driving with HVAC mode" wherein the HVAC is engaged with the motor generator and the master clutch is closed while propelling the vehicle and open during EOC. The controller can further operate the transmission system in a "sleep mode" wherein the motor generator is disengaged from the countershaft and coupled to the HVAC compressor, the motor generator powering the HVAC compressor using energy stored while driving.

A transmission system selectively coupled to an engine crankshaft of an internal combustion engine arranged on a vehicle according to another example of the present disclosure includes a transmission, a motor generator, an HVAC compressor and a controller. The transmission has an input shaft, a mainshaft, an output shaft and a countershaft offset from the input shaft. The countershaft is drivably connected to the first input shaft and the mainshaft. The motor generator is selectively coupled to the countershaft and is configured to charge a battery in an energy storage mode and be powered by the battery in an energy use mode. The HVAC compressor is selectively driven by the motor generator. The controller operates the transmission system in various modes based on operating conditions. The various modes comprise (i) an engine off coasting (EOC) mode wherein the engine is defueled and the motor generator is in the energy storage mode, and (ii) an sleep mode wherein the motor generator powers the HVAC compressor while the engine is off.

According to additional features, the transmission system further includes a master clutch having a driving portion connected to the engine crankshaft and a driven portion coupled to the transmission input shaft and adapted to frictionally engage the driving portion between open and closed positions. The controller operates the transmission system in the EOC mode and routes rotational energy from the output shaft, through the countershaft and into the motor generator. A planetary gear set is coupled between the countershaft and the motor generator. A one-way clutch is coupled between the countershaft and the planetary gear set. The motor generator is one of a 24 volt and 48 volt motor.

In additional features, the controller operates the transmission system in a "crank mode" wherein the HVAC compressor is disengaged from the motor generator and the motor generator turns the internal combustion engine. The controller can further operate the transmission system in a "creep mode" wherein the HVAC compressor is disengaged from the motor generator and the motor generator powers the vehicle. The controller can further operate the transmission system in a "driving with no HVAC mode" wherein the HVAC is disengaged from the motor generator and the master clutch is closed while propelling the vehicle and open during EOC. The controller can further operate in a "driving with HVAC mode" wherein the HVAC is engaged with the motor generator and the master clutch is closed while propelling the vehicle and open during EOC.

BRIEF DESCRIPTION OF THE DRAWINGS

The present disclosure will become more fully understood from the detailed description and the accompanying drawings, wherein.

DETAILED DESCRIPTION

As will become appreciated from the following discussion, the instant disclosure replaces a vehicle electrical system from a traditional "front end accessory drive" (FEAD) that drives accessory components such as the electrical charging system (alternator) and the compressor that drives the HVAC air conditioner. The vehicle electrical system according to the present disclosure is instead driven by the transmission countershaft. Such a configuration allows a new operating mode of coasting while the engine is off (Engine Off Coasting or EOC), while still providing electrical power by driving the charging system from the vehicle wheels while the engine is stopped (defueled) and the vehicle is still moving.

In commercial long-haul class 8 vehicles, commonly referred to as "18-wheeler sleeper cabs", traditionally the FEAD drives accessory components such as the electrical charging system and the compressor that drives the HVAC air conditioner. Historically, operators of such vehicles would run the engine nearly all the time including while driving for propulsion and idling while stopped to maintain the accessory functions such as "hotel loads" including lights, television, refrigerator and HVAC cooling in summer months. In an effort to improve fuel economy, fleet policy and laws in many locations prohibit idling for extended periods of time. Many solutions to provide the required electricity and cooling have been commercialized, including the addition of a small engine for that function (APU), addition of batteries that run an electrical air conditioner that are charged while driving, and periodic cycling of the engine.

Original equipment manufacturers have followed two paths for engine off air conditioning. In a first implementation, the existing belt driven compressor is used while driving and a second electrically driven compressor is used while the engine is off. Such a solution adds cost and complexity. In a second implementation, a purely electrically driven compressor is operated for all of the HVAC demand. The disadvantage of a full-time electric HVAC system are two-fold: First, the increase in power demand exceeds the available power in 12V systems driving the industry to higher system voltage (especially 48V). Secondly, the system efficiency suffers when the engine shaft power is converted to electricity then converted back to shaft power to drive the compressor while driving.

Figure 1:
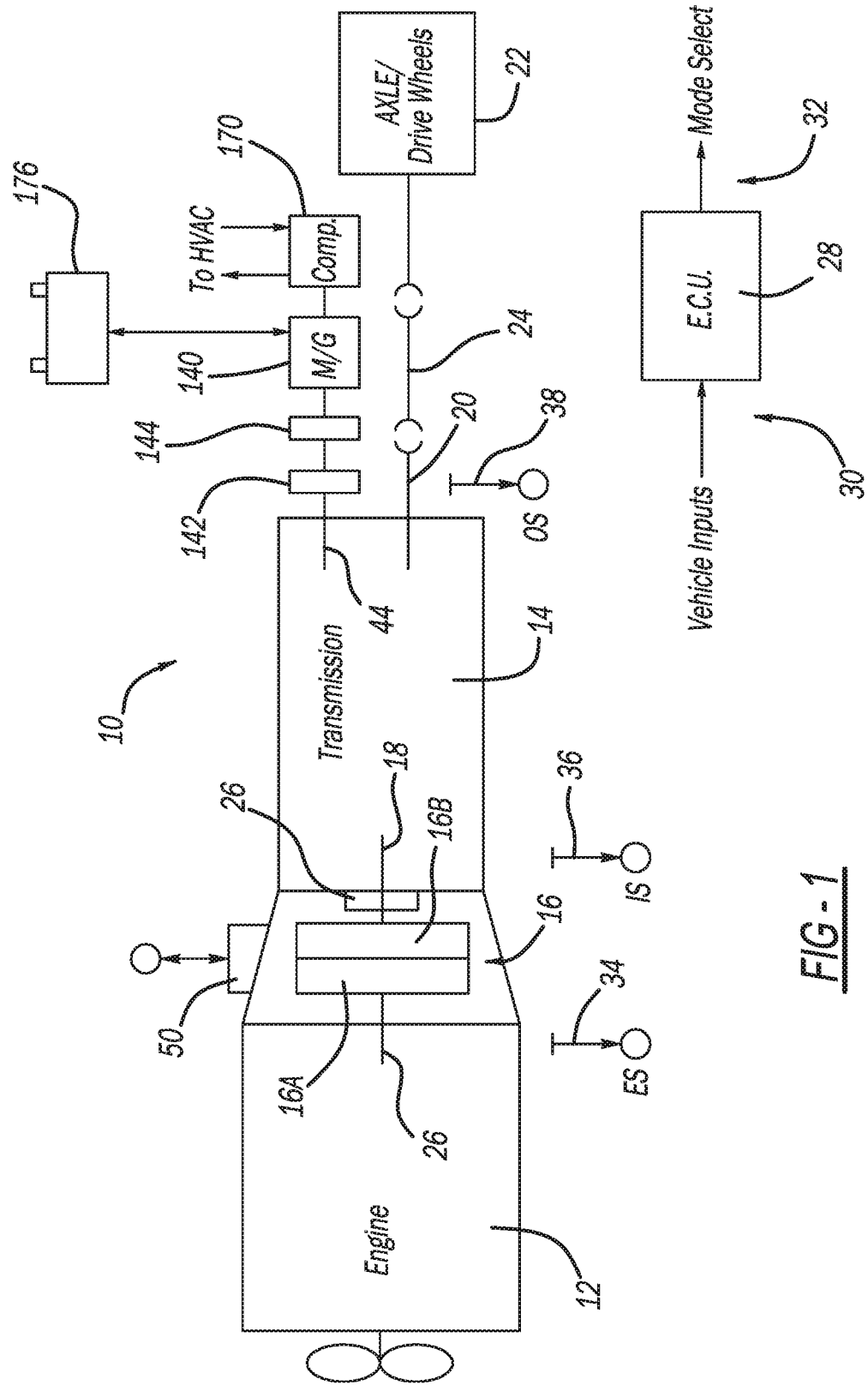
FIG. 1 is a schematic of an automated mechanical transmission system coupled to an engine, the transmission system having a motor generator coupled to a countershaft according to one example of the present disclosure.

With initial reference to FIG. 1, an AMT system constructed in accordance with one example of the present disclosure is shown and referred to at reference 10. The AMT system 10 is selectively coupled to a fuel-controlled engine 12 (such as a diesel engine or the like), a multiple-speed, change-gear transmission 14 and a master clutch 16 drivingly interposed between the engine 12 and an input shaft 18 of the transmission 14. The transmission 14 may be of the compound type comprising a main transmission section connected in series with a splitter and/or range-type auxiliary section. Transmissions of this type, especially as used with heavy duty vehicles, typically have 9, 10, 12, 13, 16 or 18 forward speeds. A transmission output shaft 20 extends outwardly from the transmission 14 and is drivingly connected with vehicle drive axles 22, usually by means of a prop shaft 24.

The master clutch 16 includes a driving portion 16A connected to an engine crankshaft/flywheel 26 and a driven portion 16B coupled to the transmission input shaft 18 and adapted to frictionally engage the driving portion 16A. An electronic control unit (ECU) 28 is provided for receiving input signals 30 and for processing same in accordance with predetermined logic rules to issue command output signals 32 to the transmission system 10. The system 10 can also include a rotational speed sensor 34 for sensing rotational speed of the engine 12 and providing an output signal (ES) indicative thereof, a rotational speed sensor 36 for sensing the rotational speed of the input shaft 16 and providing an output signal (IS) indicative thereof, and a rotational speed sensor 38 for sensing the speed of the output shaft 20 and providing an output signal (OS) indicative thereof. The master clutch 16 may be controlled by a clutch actuator 50 responding to output signals from the ECU 28.

The transmission 14 has one or more mainshaft sections 40. The mainshaft 40 is coaxial with the input shaft 18. The transmission 14 has a first countershaft 42 and a second countershaft 44. The countershafts 42 and 44 are offset from the input shaft 18 and the mainshaft 40. The countershafts 42 and 44 are illustrated as being offset from one another, however in some examples the countershafts 42 and 44 may be coaxial with each other. The output shaft 20 may be coaxial with the mainshaft 40.

Figure 2:
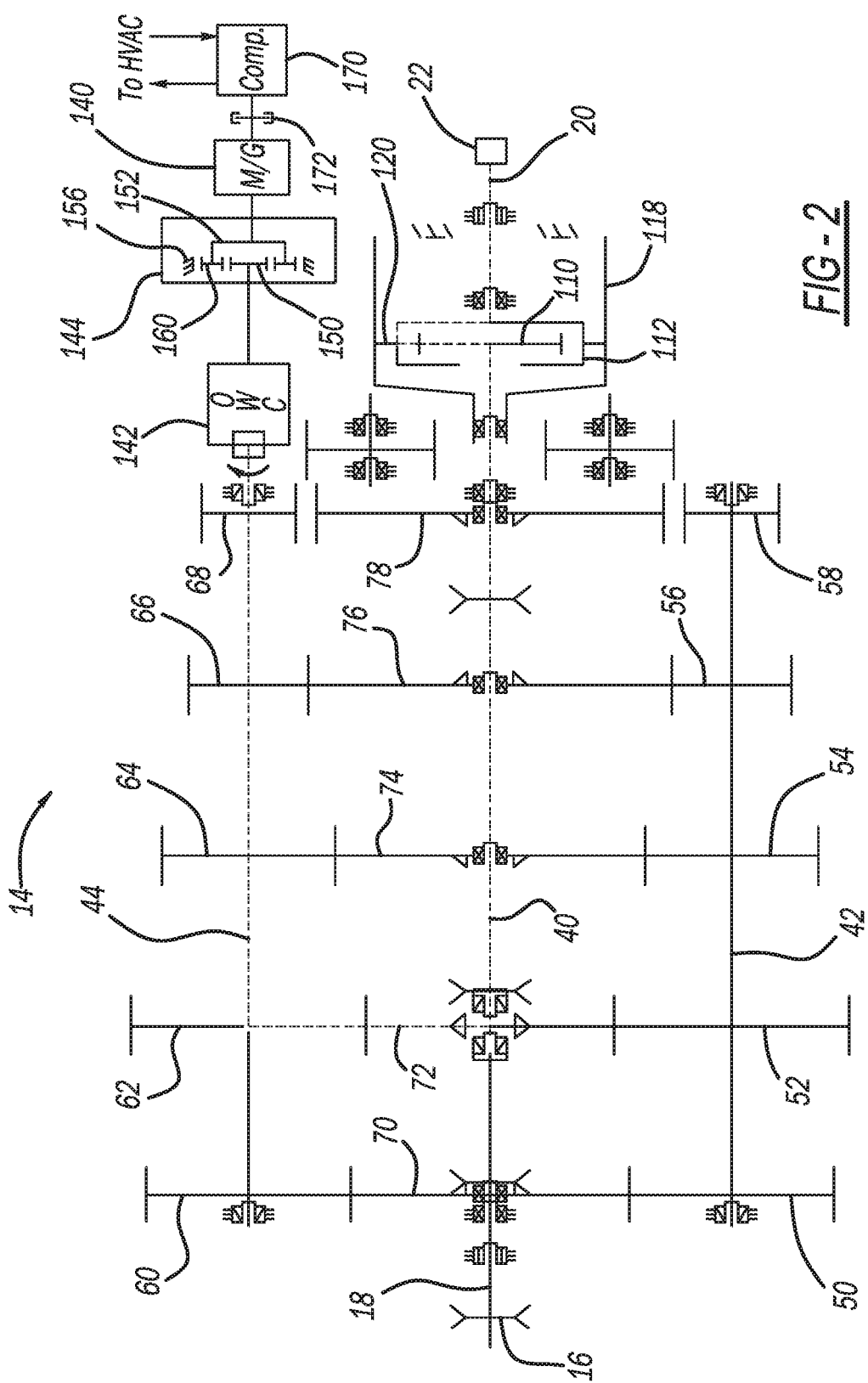
FIG. 2 is a schematic illustration of the automated mechanical transmission system of FIG. 1 and shown in a first mode of operation.

The first countershaft 42 is supported for rotation by the transmission 14 housing by bearings. The first countershaft 42 of the transmission 14 has countershaft gears 50, 52, 54, 56 and 58. The second countershaft 44 is supported for rotation by the transmission 14 housing by bearings. The second countershaft 44 of the transmission 14 has countershaft gears 60, 62, 64, 66 and 68. The mainshaft 40 of the transmission 14 has mainshaft gears 70, 72, 74, 76 and 78. The master clutch 80 can selectively communicate torque into the transmission 14. A headset clutch 84, a first sliding dog clutch 88 and a second sliding dog clutch 90 can move left and right as viewed in FIG. 2 to connect various mainshaft gears 70-78 and countershaft gears 50-58 and 60-68 for attaining a desired drive gear and torque path within the transmission 14.

The right hand end of the mainshaft 40 is drivably connected to a sun gear 110. A planetary carrier 112 is connected to or is integral with the output shaft 20, which is connected drivably through a drive axle 22 to vehicle traction wheels. A ring gear 118 engages planet pinions 120 carried by the carrier 112.

According to one example of the present disclosure, a motor generator 140 can be selectively coupled to the second countershaft 44 (or the transmission power take-off, PTO). As will become appreciated herein, the motor generator 140 is configured to run in two opposite modes. In a first mode, the motor generator 140 operates as a motor by consuming electricity to make mechanical power. In the first mode the vehicle can be moved at very low speeds (such as less than 2 MPH) from electrical power. Traditionally, it is difficult to move a commercial long-haul class 8 vehicle at very low speeds, especially in reverse with an engine clutch.

In a second mode, the motor generator 140 operates as a generator by consuming mechanical power to produce electricity. In one configuration a one-way clutch 142 and a planetary gear assembly 144 can be coupled between the second countershaft 44 and the motor generator 140. The planetary gear assembly 144 can be a speed-up gear assembly having a sun gear 150. A planetary carrier 152 is connected to or integral with the second countershaft 44, which is connected drivably to the motor generator 140. A ring gear 156 engages planet pinions 160 carried by the carrier 152. The planetary gear assembly 144 can fulfill requirements of a 21:1 cold crank ratio needed to crank the engine 12 when the motor generator 140 is a 9 kW Remy 48V motor.

By way of example only, the motor generator 140 can be a 6-20 kilowatt, 24-48 volt motor. The motor generator 140 can be ultimately driven by the second countershaft 44 and be connected to an HVAC compressor 170 through a clutch 172. The compressor 170 can then communicate with components of the HVAC as is known in the art. The motor generator 140 can charge a battery 176 (FIG. 1) in an energy storage mode and be powered by the battery 176 in an energy use mode.

Various advantages can be realized by mounting the motor generator 140 to the countershaft 44 of the transmission 14. In one operating mode, as will be described in greater detail below, the engine can be turned off (defueled) while the vehicle is still moving or coasting (EOC) and the motor generator 140 is regenerating resulting in up to three percent fuel efficiency increase. In other advantages, the battery 176 (or batteries) can be mounted in an engine compartment near the motor generator 140 reducing battery cable length over conventional mounting configurations. Moreover, various components may be eliminated with the transmission system 10 including, but not limited to a starter, an alternator, hydraulic power steering, synchronizers, and transmission inertia brake. In this regard, significant weight savings may be realized. In some arrangements, the transmission system 10 can be configured for use on vehicles with electric steering.

The controller 28 can operate the transmission system 10 in various operating modes. In a first mode, the controller 28 operates the master clutch 16 in an open condition with the transmission 14 in gear. In the first mode or engine off coasting, the controller 28 turns the engine off or defuels the engine 12 while the vehicle is moving based on vehicle operating conditions and routes rotational energy from the output shaft 20, through the second countershaft 44 and into the motor generator 140. According to various examples, the vehicle operating conditions can include input signals 30 related to any operating conditions including but not limited to a global positioning system (GPS) signal, a grade sensor signal and a vehicle speed sensor signal. As can be appreciated, it would be advantageous to run the transmission system 10 in the first mode when the vehicle is travelling downhill. Elevation changes can be attained from a GPS signal and/or a grade sensor for example.

In a second mode, the controller 28 operates the master clutch 16 in a closed condition with the transmission 14 in neutral. In the second mode, the controller 28 can facilitate engine start and idle generation. In a third mode, the controller 28 operates the master clutch 16 in an open condition and the transmission 14 in neutral. The third mode can be used for synchronization and inertia brake. In a fourth mode, the controller 28 operates the master clutch 16 in a closed condition and the transmission 14 in gear. The fourth mode can be used for normal cruising and generation.

Additional operating modes provided by the transmission system 10 specific to engagement and disengagement with the compressor 170 will be described. As used herein, the modes are described as a "crank mode", a "creep mode", a "driving with no HVAC mode", a "driving with HVAC mode" and a "sleep mode". These modes are described in sequence below.

In the crank mode, a ratio of 21:1 between the countershaft 44 and the motor generator 140 would be selected. Other ratios are contemplated. The HVAC compressor 170 would be disengaged such as by the clutch 172. The transmission 14 would be in neutral with the master clutch 16 closed. The motor generator 140 would turn the engine 12 with sufficient torque to crank the engine 12.

In the creep mode, a ratio of 21:1 between the countershaft 44 and the motor generator 140 would be selected. Other ratios are contemplated. The HVAC compressor 170 would be disengaged such as by the clutch 172. The transmission 14 would be in first gear or low reverse gear. The master clutch 16 would be held open with the engine 12 stopped (or idling). The motor generator 140 would have sufficient torque to move the vehicle in forward or reverse such as at 0 MPH to 2 MPH with outstanding speed and torque control, allowing a truck to back into a trailer or a dock without damage.

In the driving with no HVAC mode, a 7:1 ratio between the countershaft 44 and the motor generator 140 would be selected. Other ratios are contemplated. The HVAC compressor 170 would be disengaged such as by the clutch 172. The transmission 14 would be in the appropriate gear and the master clutch 16 would be closed while propelling the vehicle, and open with the engine off in EOC mode.

In the driving with HVAC mode, a 7:1 ratio between the countershaft 44 and the motor generator 140 would be selected. The HVAC compressor 170 would be engaged with a 3.5:1 ratio to the motor generator 140. The transmission 14 would be in the appropriate gear, and the master clutch 16 would be closed while propelling the vehicle, and open with the engine 12 off in EOC mode. The HVAC system is directly driven by the engine or the driveline, eliminating the efficiency loss of converting power to electricity and back to work. Also the HVAC system could provide cooling in the EOC mode, converting the inertia of a vehicle on a downgrade to cooling for additional energy recovery, and prefer to cool while the engine 12 is off for more fuel savings.

In the sleep mode, the motor generator 140 would be disconnected from the countershaft 44. The motor generator 140 would be coupled to the HVAC compressor 170 through a 3.5:1 ratio. The motor generator 140 could use energy stored in the battery 176 during the driving portion of the cycle to operate the HVAC. This provides the cooling function without the addition of a separate motor and inverter to power the HVAC compressor. A number of mechanical solutions involving sliding clutches, countershaft type gears and planetary gears can be used to obtain the correct ratio in each operating mode. Ideally, a single actuator is used to change between the above the described modes.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A transmission system selectively coupled to an engine crankshaft of an internal combustion engine arranged on a vehicle, the transmission system comprising:
   a transmission having an input shaft directly driven by the engine crankshaft through a master clutch, a mainshaft having a plurality of mainshaft gears, an output shaft and a countershaft offset from the input shaft, the countershaft having a plurality of countershaft gears that selectively connect with the plurality of mainshaft gears, the countershaft drivably connected to the first input shaft and the mainshaft through the plurality of countershaft gears and the plurality of mainshaft gears;
   a motor generator selectively coupled to the countershaft;
   an HVAC compressor selectively driven by the motor generator; and
   a controller that operates the transmission system in various modes based on operating conditions, the various modes comprising a first engine off coasting (EOC) operating mode that includes defueling the engine while the vehicle is moving based on vehicle operating conditions and routes rotational energy from the output shaft, through the countershaft and into the motor generator.

2. The transmission system of claim 1 wherein the master clutch includes a driving portion connected to the engine crankshaft and a driven portion coupled to the transmission input shaft and adapted to frictionally engage the driving portion between open and closed positions.

3. The transmission system of claim 1, further comprising a planetary gear set coupled between the countershaft and the motor generator.

4. The transmission system of claim 3, further comprising a one-way clutch coupled between the countershaft and the planetary gear set.

5. The transmission system of claim 4 wherein the motor generator is one of a 24 volt and 48 volt motor.

6. The transmission system of claim 1, wherein the controller operates the transmission system in a "crank mode" wherein the HVAC compressor is disengaged from the motor generator and the motor generator turns the internal combustion engine.

7. The transmission system of claim 1, wherein the controller operates the transmission system in a "creep mode" wherein the HVAC compressor is disengaged from the motor generator and the motor generator powers the vehicle.

8. The transmission system of claim 2, wherein the controller operates the transmission system in a "driving with no HVAC mode" wherein the HVAC is disengaged from the motor generator and the master clutch is closed while propelling the vehicle and open during EOC.

9. The transmission system of claim 2, wherein the controller operates the transmission system in a "driving with HVAC mode" wherein the HVAC is engaged with the motor generator and the master clutch is closed while propelling the vehicle and open during EOC.

10. The transmission system of claim 1 wherein the controller operates the transmission system in a "sleep mode" wherein the motor generator is disengaged from the countershaft and coupled to the HVAC compressor, the motor generator powering the HVAC compressor using energy stored while driving.

11. A transmission system selectively coupled to an engine crankshaft of an internal combustion engine arranged on a vehicle, the transmission system comprising:
    a transmission having an input shaft directly driven by the engine crankshaft through a master clutch, a mainshaft having a plurality of mainshaft gears, an output shaft and a countershaft offset from the input shaft, the countershaft having a plurality of countershaft gears that selectively connect with the plurality of mainshaft gears, the countershaft drivably connected to the first input shaft and the mainshaft through the plurality of countershaft gears and the plurality of mainshaft gears;
    a motor generator selectively coupled to the countershaft and configured to charge a battery in an energy storage mode and be powered by the battery in an energy use mode;
    an HVAC compressor selectively driven by the motor generator; and
    a controller that operates the transmission system in various modes based on operating conditions, wherein the various modes comprise (i) an engine off coasting (EOC) mode wherein the engine is defueled and the motor generator is in the energy storage mode and (ii) a sleep mode wherein the motor generator powers the HVAC compressor while the engine is off.

12. The transmission system of claim 11,
    wherein the master clutch includes a driving portion connected to the engine crankshaft and a driven portion coupled to the transmission input shaft and adapted to frictionally engage the driving portion between open and closed positions; and
    wherein the controller operates the transmission system in the EOC mode and routes rotational energy from the output shaft, through the countershaft and into the motor generator.

13. The transmission system of claim 11, further comprising a planetary gear set coupled between the countershaft and the motor generator.

14. The transmission system of claim 13, further comprising a one-way clutch coupled between the countershaft and the planetary gear set.

15. The transmission system of claim 14 wherein the motor generator is one of a 24 volt and 48 volt motor.

16. The transmission system of claim 11, wherein the controller operates the transmission system in a "crank mode" wherein the HVAC compressor is disengaged from the motor generator and the motor generator turns the internal combustion engine.

17. The transmission system of claim 11, wherein the controller operates the transmission system in a "creep mode" wherein the HVAC compressor is disengaged from the motor generator and the motor generator powers the vehicle.

18. The transmission system of claim 12, wherein the controller operates the transmission system in a "driving with no HVAC mode" wherein the HVAC is disengaged from the motor generator and the master clutch is closed while propelling the vehicle and open during EOC.

19. The transmission system of claim 12, wherein the controller operates the transmission system in a "driving with HVAC mode" wherein the HVAC is engaged with the motor generator and the master clutch is closed while propelling the vehicle and open during EOC.

20. A transmission system selectively coupled to an engine crankshaft of an internal combustion engine arranged on a vehicle, the transmission system comprising:
- a transmission having an input shaft directly driven by the engine crankshaft through a master clutch, a mainshaft having a plurality of mainshaft gears, an output shaft and a countershaft offset from the input shaft, the countershaft having a plurality of countershaft gears that selectively connect with the plurality of mainshaft gears, the countershaft drivably connected to the input shaft and the mainshaft through the plurality of countershaft gears and the plurality of mainshaft gears;
- a motor generator selectively coupled to the countershaft and configured to charge a battery in an energy storage mode and be powered by the battery in an energy use mode;
- an HVAC compressor selectively driven by the motor generator; and
- a controller that selectively and alternatively operates the transmission system in various modes based on operating conditions, wherein the various modes comprise:
  - (i) a "crank mode" wherein the HVAC compressor is disengaged from the motor generator and the motor generator turns the internal combustion engine;
  - (ii) a "creep mode" wherein the HVAC compressor is disengaged from the motor generator and the motor generator powers the vehicle;
  - (iii) a "driving with no HVAC mode" wherein the HVAC is disengaged from the motor generator and the master clutch is closed while propelling the vehicle and open during an engine off coasting (EOC) mode wherein the engine is defueled and the motor generator is in the energy storage mode;
  - (iv) a "driving with HVAC mode" wherein the HVAC is engaged with the motor generator and the master clutch is closed while propelling the vehicle and open during EOC; and
  - (v) a "sleep mode" wherein the motor generator is disengaged from the countershaft and coupled to the HVAC compressor, the motor generator powering the HVAC compressor using energy stored while driving.

21. The transmission system of claim 1 wherein the motor generator consists of a single motor generator that is the only motor generator of the transmission system.

22. The transmission system of claim 11 wherein the motor generator consists of a single motor generator that is the only motor generator of the transmission system.

23. The transmission system of claim 20 wherein the motor generator consists of a single motor generator that is the only motor generator of the transmission system.

\* \* \* \* \*

UNITED STATES PATENT AND TRADEMARK OFFICE
CERTIFICATE OF CORRECTION

PATENT NO. : 11,130,388 B2
APPLICATION NO. : 16/400305
DATED : September 28, 2021
INVENTOR(S) : Stoltz Page 1 of 1

It is certified that error appears in the above-identified patent and that said Letters Patent is hereby corrected as shown below:

On the Title Page

Item (57), in Column 2, in "Abstract", Line 3, delete "generator" and insert -- generator, --, therefor.

In the Specification

In Column 1, Line 44, delete "generator" and insert -- generator, --, therefor.

In the Claims

In Column 7, Line 17, in Claim 1, after "to the" delete "first".

In Column 8, Line 13, in Claim 11, after "to the" delete "first".

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*